(12) United States Patent
Kwasniewski

(10) Patent No.: US 10,215,301 B2
(45) Date of Patent: Feb. 26, 2019

(54) ROTARY ACTUATION MECHANISM

(71) Applicant: Hamilton Sundstrand Corporation, Charlotte, NC (US)

(72) Inventor: Pawel Kwasniewski, Olawa (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/622,331

(22) Filed: Jun. 14, 2017

(65) Prior Publication Data
US 2017/0356565 A1     Dec. 14, 2017

(30) Foreign Application Priority Data

Jun. 14, 2016    (EP) ..................................... 16174457

(51) Int. Cl.
| | | |
|---|---|---|
| *F16K 31/04* | (2006.01) | |
| *F16H 37/12* | (2006.01) | |
| *F16K 1/22* | (2006.01) | |
| *F16K 31/53* | (2006.01) | |
| *F16K 31/54* | (2006.01) | |
| *F16H 19/04* | (2006.01) | |
| *F16H 25/20* | (2006.01) | |

(52) U.S. Cl.
CPC ........... *F16K 31/043* (2013.01); *F16H 37/12* (2013.01); *F16K 1/221* (2013.01); *F16K 31/535* (2013.01); *F16K 31/54* (2013.01); *F16H 19/04* (2013.01); *F16H 25/20* (2013.01); *F16H 2025/204* (2013.01); *F16H 2025/2075* (2013.01)

(58) Field of Classification Search
CPC ...... F16K 31/043; F16K 31/535; F16K 31/54; F16K 1/221; F16H 37/12; F16H 25/20; F16H 19/04; F16H 2025/2075; F16H 2025/204

USPC ... 251/305–308, 129.11–129.13, 250, 250.5; 123/337

See application file for complete search history.

(56) References Cited

U.S. PATENT DOCUMENTS

| | | | |
|---|---|---|---|
| 3,338,140 A | | 8/1967 | Sheesley |
| 3,473,397 A | | 10/1969 | Fry |
| 3,591,127 A | | 7/1971 | Torrance et al. |
| 4,559,843 A | | 12/1985 | Nilsson |
| 4,586,392 A | | 5/1986 | Nilsson |
| 4,651,627 A | | 3/1987 | Stewart |
| 6,036,172 A | * | 3/2000 | Pajard ...................... F02D 9/10 251/250 |
| 6,371,439 B1 | * | 4/2002 | Trevisan ............... F15B 15/065 251/58 |
| 6,646,395 B2 | * | 11/2003 | Reimann ................. F02D 9/104 251/129.11 |
| 6,776,083 B2 | | 8/2004 | Helasuo et al. |
| 6,843,239 B2 | | 1/2005 | Fensom et al. |
| (Continued) | | | |

OTHER PUBLICATIONS

Extended European Search Report for International Application No. 16174457.8 dated Nov. 24, 2016, 7 pages.

*Primary Examiner* — John Bastianelli
(74) *Attorney, Agent, or Firm* — Cantor Colburn LLP

(57) ABSTRACT

An actuation mechanism for a rotary element, comprises an electric drive motor coupled to a threaded drive spindle. A threaded drive nut is received on said drive spindle for movement along said drive spindle. A rack gear is coupled to said drive nut. A pinion gear is drivingly engaged with said rack gear and drivingly couplable to the rotary element. The rotary element may be a valve element.

10 Claims, 4 Drawing Sheets

(56) References Cited

U.S. PATENT DOCUMENTS

| | | | | |
|---|---|---|---|---|
| 7,191,754 B2* | 3/2007 | Keefover | ............ | F02D 9/1065 251/305 |
| 2003/0052296 A1* | 3/2003 | Minegishi | ............ | F02D 9/1065 251/305 |
| 2004/0183040 A1* | 9/2004 | Kvvon | ............ | F16K 1/221 251/250 |
| 2005/0092956 A1* | 5/2005 | Fauni | ............ | F02D 9/1065 251/305 |
| 2007/0240677 A1* | 10/2007 | Sasaki | ............ | F16K 1/221 251/306 |
| 2010/0025610 A1 | 2/2010 | Eschborn et al. | | |
| 2012/0260755 A1 | 10/2012 | Asher et al. | | |
| 2013/0228230 A1 | 9/2013 | Joy et al. | | |

* cited by examiner

ROTARY ACTUATION MECHANISM

FOREIGN PRIORITY

This application claims priority to European Patent Application No. 16174457.8 filed Jun. 14, 2016, the entire contents of which is incorporated herein by reference.

TECHNICAL FIELD

The present disclosure relates to a rotary actuation mechanism, more particularly but not exclusively for a rotary valve, for example a butterfly valve or ball valve.

BACKGROUND

Rotary valves are widely known. A typical rotary valve comprises a valve element which is rotatably mounted in a flow passage. The valve element rotates between an open position in which the valve element permits flow through the flow passage and a closed position in which the valve element extends across the flow passage to block the flow through the flow passage. In a butterfly valve, the valve element is a disc which rotates between a position in which it is edge-on to the flow, providing a minimal obstruction to flow, thereby leading to a low pressure drop across the valve, and a closed position in which the disc blocks the flow passage. The valve element may be held at positions intermediate the open and closed positions in order to regulate the flow through the flow passage.

The valve element is rotated by a suitable actuation mechanism externally of the flow passage. Such actuation mechanisms may be complicated, heavy and expensive.

SUMMARY

Disclosed herein is an actuation mechanism for a rotary element, comprising an electric drive motor coupled to a threaded drive spindle. A threaded drive nut is received on the drive spindle for movement along the drive spindle. A rack gear is coupled to the drive nut. A pinion gear is drivingly engaged with the rack gear and drivingly couplable to the rotary element.

The mechanism may further comprise an anti-rotation element cooperating with the drive nut to prevent the drive nut rotating on the drive spindle.

The anti-rotation element may comprise a shaft extending parallel to the drive spindle and the drive nut may comprise a collar which is slidably received on the shaft.

Distal ends of the drive spindle and the shaft may be supported in a common support.

In embodiments, the pinion gear may project over the shaft.

The pinion gear may extends over an angle of less than 360°. In embodiments, the pinion gear may be a quadrant gear.

The disclosure also provides a rotary valve assembly comprising a valve element rotatably mountable within a flow passage for rotary motion between an open position in which it permits flow through the flow passage and a closed position in which it blocks flow through the flow passage. The valve assembly further comprises an actuation mechanism in accordance with the disclosure, the pinion gear of the actuation mechanism being drivingly coupled to the valve element.

The valve element may comprise a disc.

The valve assembly may further comprise a valve housing comprising a duct portion receiving the valve element and an actuator portion receiving the actuation mechanism.

The actuator portion may be integral with the duct portion. In other embodiments, however, the actuator portion may be separate from and mounted to the duct portion.

The actuation portion may comprise a portion overhanging a side of said duct portion, the drive motor being at least partially arranged in the overhanging portion.

The valve assembly may further comprise a cover closing the actuation portion.

The cover may comprises an electrical connector for connection of a power supply to the electric drive motor.

The duct portion of the valve housing may comprise mounting flanges at opposed ends thereof.

BRIEF DESCRIPTION OF DRAWINGS

An embodiment of this disclosure will now be described by way of example only with reference to the accompanying drawings in which.

DETAILED DESCRIPTION

With reference to the Figures, a rotary valve assembly 2 comprises a valve housing 4, a rotary valve element 6 and a rotary actuation mechanism 8 for rotating the valve element 6.

Figure 4:
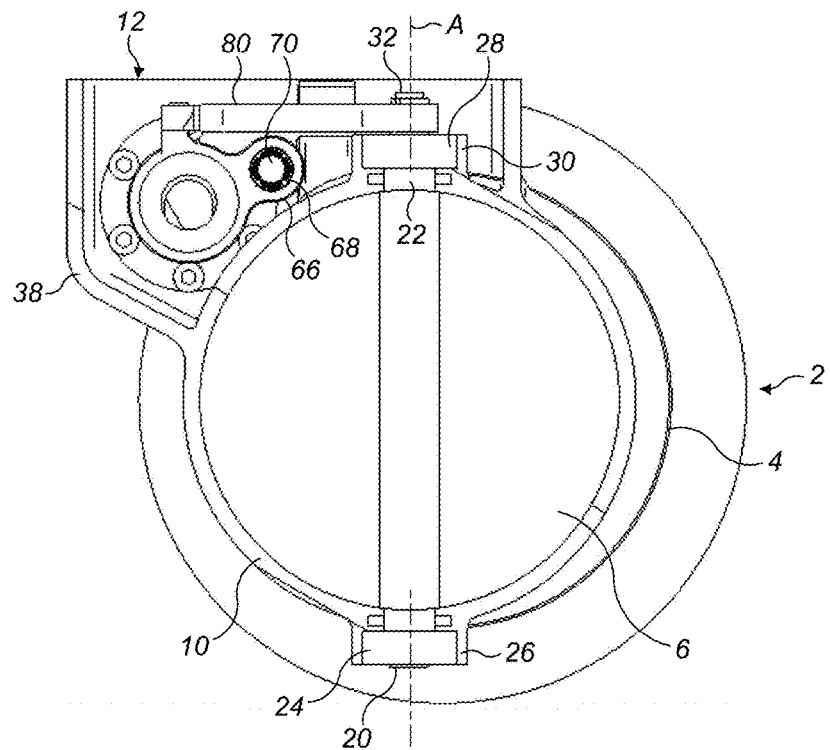
FIG. 4 shows a vertical cross-sectional view along the line A-A of FIG. 3.

The valve housing 4 comprises a duct portion 10 and an actuator portion 12. As can be seen in FIG. 4 for example, the valve element 6 is received within the duct portion 10 and the actuation mechanism 8 received within the actuator portion 12. The actuator portion 12 is closed by a cover 14 as will be described further below.

The duct portion 10 defines a flow passage 16 and mounting flanges 18 at opposed ends thereof to allow it to be mounted to adjacent ducts by coupling means not illustrated. For example the flanges 18 and flanges of the adjacent ducts may be provided with a series of holes for receiving mounting bolts or the like. Alternatively, the mounting flanges 18 may be clamped to flanges of the adjacent ducts by external clamps.

In this embodiment, the duct portion 10 and the actuator portion 12 of the valve housing 4 are formed integrally, for example by a casting process such as investment casting, although a multi-part construction also falls within the scope of this disclosure. The material of the valve housing 4 may be chosen in accordance with the intended application. It may, for example, by aluminium or steel.

The valve assembly 2 illustrated in this embodiment is a butterfly valve, with the valve element 6 being a disc which is rotatable about an axis A within the flow passage 16 between a closed position (illustrated in FIG. 6) in which the valve element 6 extends across the flow passage 16 to prevent flow through the flow passage 16 and an open position (illustrated in FIG. 7) in which it is rotated through 90° so as to be positioned to edge-on to the flow to allow flow through the duct 16. The valve element 6 may also be moved to intermediate positions between the open position and the closed position so as to regulate the flow through the flow passage.

The valve element 6 is supported in the valve housing 4 by first and second trunnions 20, 22. The trunnions 20, 22 may be formed integrally with the valve element 6 or suitably attached thereto.

The first trunnion 20 is rotatably supported in a first bearing 24 mounted in a first recess 26 provided on the valve housing 4. The second trunnion 22 is supported in a second bearing 28 mounted in a second recess 30 of the valve housing 4. The second trunnion 22 comprises a coupling portion 32 for connection to the actuation mechanism 8 as will be described further below.

The actuation mechanism 8 comprises an electric rotary actuator 40 which is mounted in the actuator portion 12 of the valve housing 4 by means of a mounting bracket 42 fastened to a mounting boss 44 of the valve housing 4 by fasteners 46.

As can be seen from FIG. 4, the actuation portion 12 of the valve housing 4 comprises an overhanging portion 38 which laterally overhangs the duct portion 10 of the valve housing 4. The actuator 40, and in particular its motor 48, is arranged at least partially within this overhanging portion 38, which allows the valve housing 4 to have a relatively low vertical profile.

Figure 5:
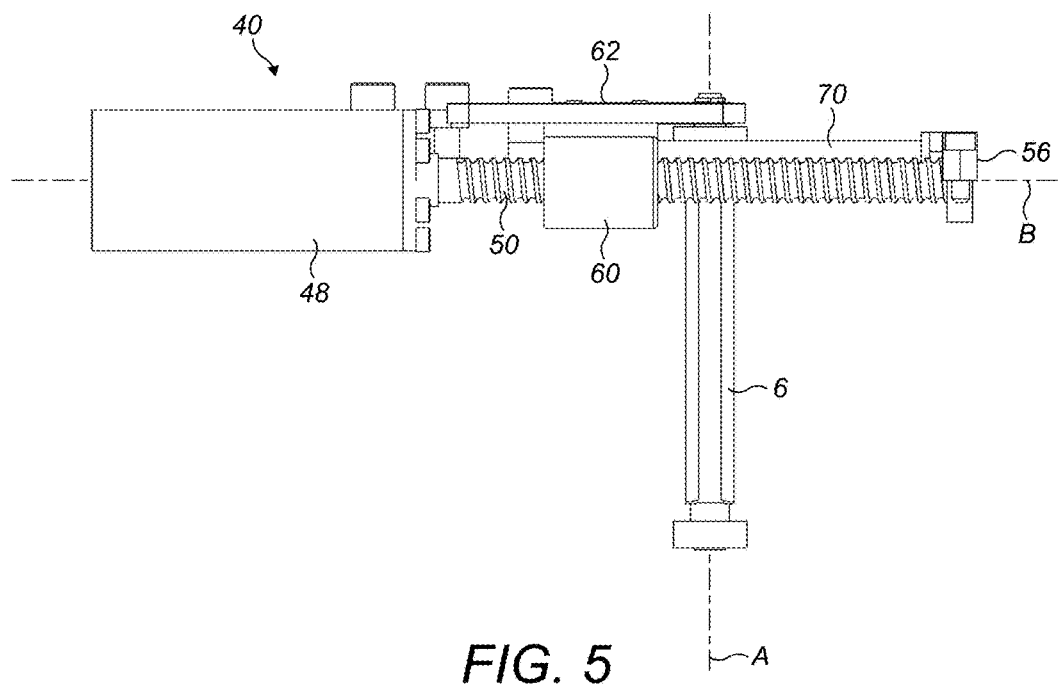
FIG. 5 shows a side view of the valve assembly components removed from the valve housing.

The rotary actuator 40 comprises a threaded drive spindle 50 extending from an electric drive motor 48. A distal end 52 of the drive spindle 50 is received in a bearing 54 which is mounted to the valve housing 4 by means of a mounting bracket 56. The mounting bracket 56 is attached to the valve housing 4 by means of fasteners 58. As will be described further below, the mounting bracket 56 also acts to mount further components of the actuation mechanism. The longitudinal axis B of the drive spindle 50 is perpendicular to the rotational axis A of the valve element 6, as can best be seen from FIG. 5.

The rotational speed of the drive motor 48 and the pitch of the drive spindle thread can be chosen to provide a desired rotational speed of the valve element 6.

An internally threaded drive nut 60 is threadably received on the drive spindle 50. A linear rack gear 62 is coupled to the drive nut 60 by means of rivets or other fasteners 64. In other embodiments, however, the rack gear 62 may be made integrally with the drive nut 60. As can be seen, the rack gear 62 in this embodiment projects longitudinally beyond the ends of the drive nut 60 and is of a length and has a pitch chosen to produce the necessary angular rotation of the valve element 6.

The drive nut 60 further comprises a laterally extending arm 66 defining a collar 68 at its distal end. The collar 68 mounts an annular slide bearing 70, for example an annular body of a low friction material. The collar 68 is received on an anti-rotation element 70. The anti-rotation element 70 comprises an elongate shaft 70. The shaft 70 is mounted at its proximal end 72 to the valve housing 4 by means of a mounting arm 74 and fastener 76. The distal end 78 of the shaft 70 is supported in the mounting bracket 56 which also supports the distal end 52 of the actuator drive spindle 50. The longitudinal axis C of the shaft 70 extends parallel to the longitudinal axis B of the drive spindle 50. As can be seen from FIG. 4, the shaft axis C in this embodiment lies above the spindle axis B. The shaft 70 is also positioned between the drive spindle 50 and the rotational axis A of the valve element 6.

A pinion gear 80 is mounted to the end of the coupling portion 32 of the valve element second trunnion 22 and is retained thereon by a circlip 82 or other suitable means. The coupling portion 32 of the second trunnion 22 and the pinion gear 80 may have any suitable coupling for example a D-shaped, square or splined coupling.

The pinion gear 80 is comprises a hub 84 mounted to the valve element second trunnion 22 and a plurality of arms 86, 88, 90 radiating from the hub 84 to an arcuate array of gear teeth 92 which mesh with the gear teeth 94 of the rack gear 62. The arms 86, 88, 90 define openings 96, 98 which reduce the weight of the pinion gear 80.

Figure 1:
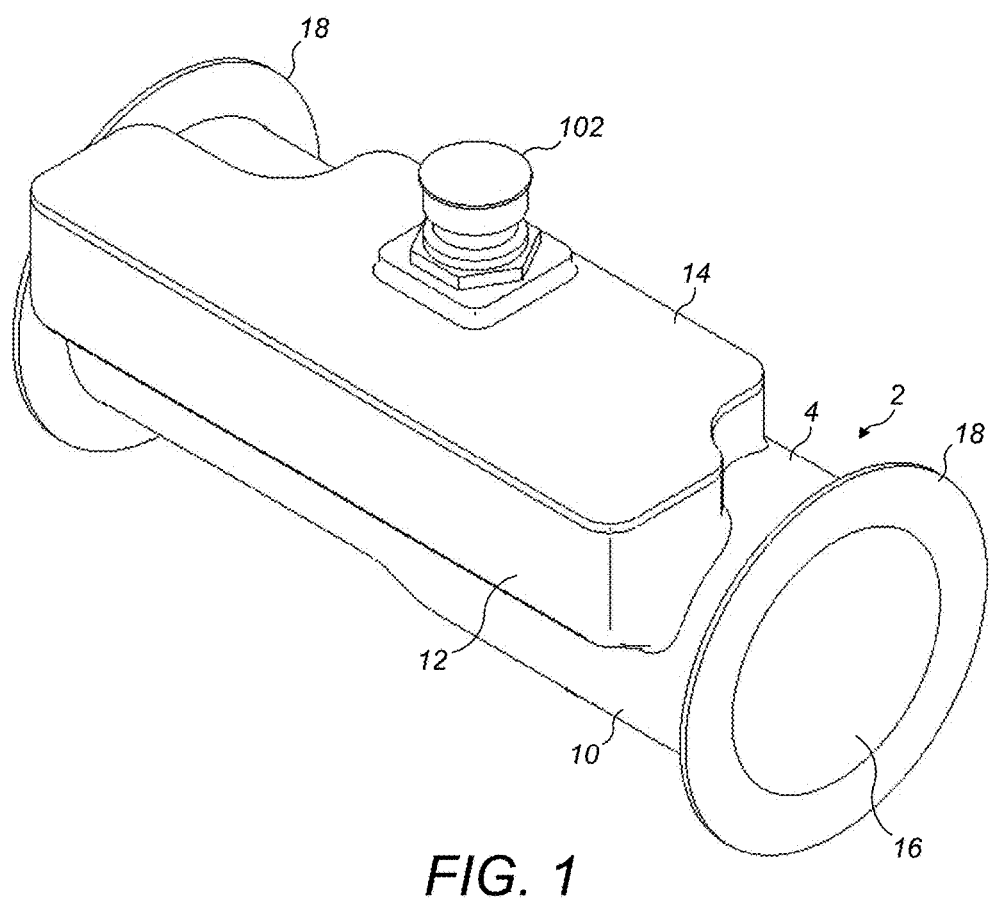
FIG. 1 shows a perspective view of a valve assembly incorporating an actuation mechanism in accordance with this disclosure.
Figure 2:
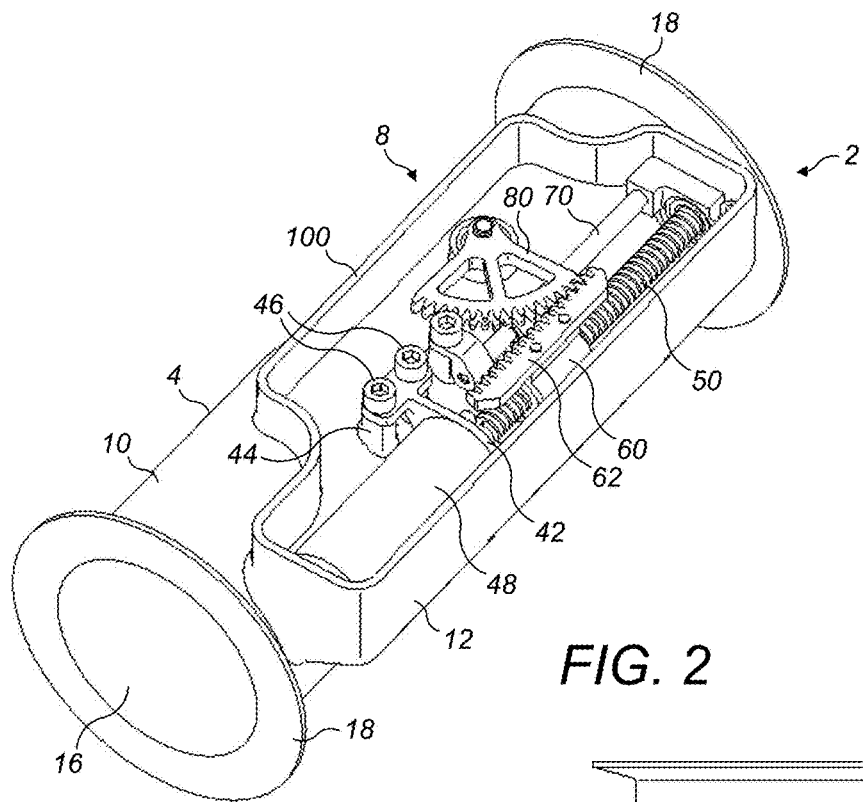
FIG. 2 shows the valve assembly of FIG. 1 with a cover removed.
Figure 3:
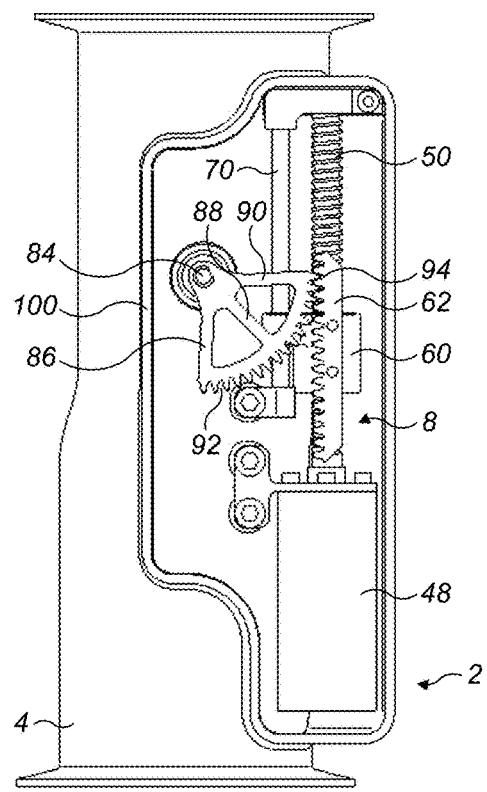
FIG. 3 shows a plan view of FIG. 2.
Figure 7:
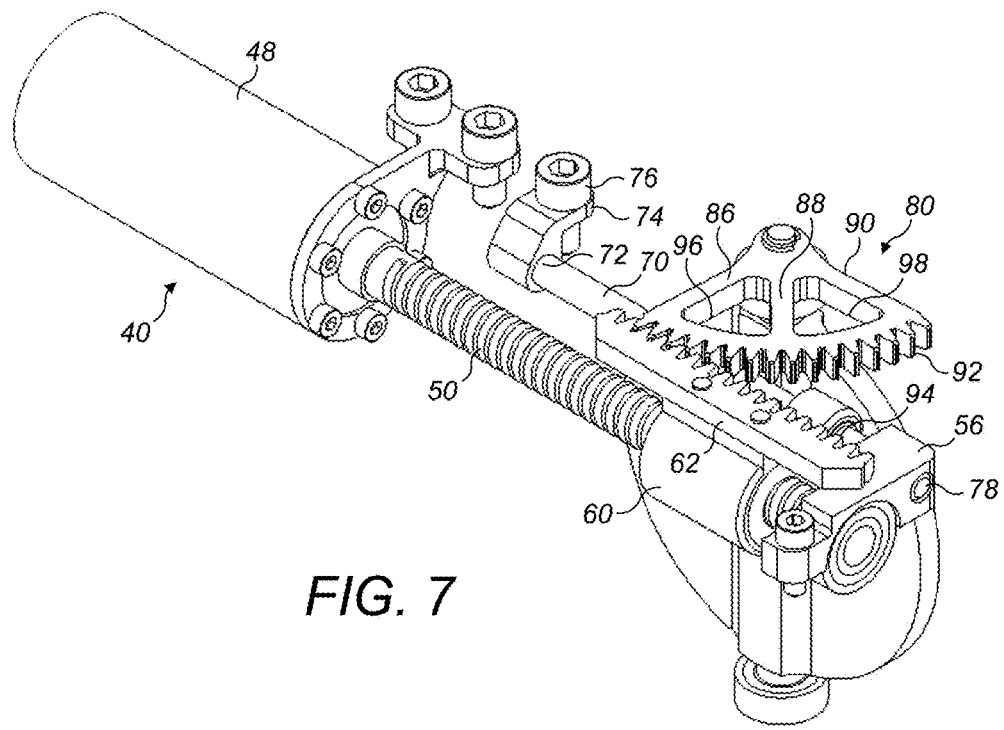
FIG. 7 shows the components in a valve open position.

In this embodiment, the pinion gear 82 is a quadrant gear, i.e. subtending an angle of about 90°. Thus as can be seen for example from FIG. 3, the gear teeth 94 extend over an angle of about 90°. As can be seen in FIGS. 2 and 3, when the valve element 6 is in its open position, arm 86 of the pinion gear lies substantially parallel to one wall 100 of the actuator portion 12 of the valve housing. When the valve element 6 is in the closed position as shown in FIG. 7, the arm 90 lies parallel to the wall 100. This form of pinion gear 82 therefore provides a compact arrangement and may reduce a lateral dimension of the valve housing 4.

Figure 6:
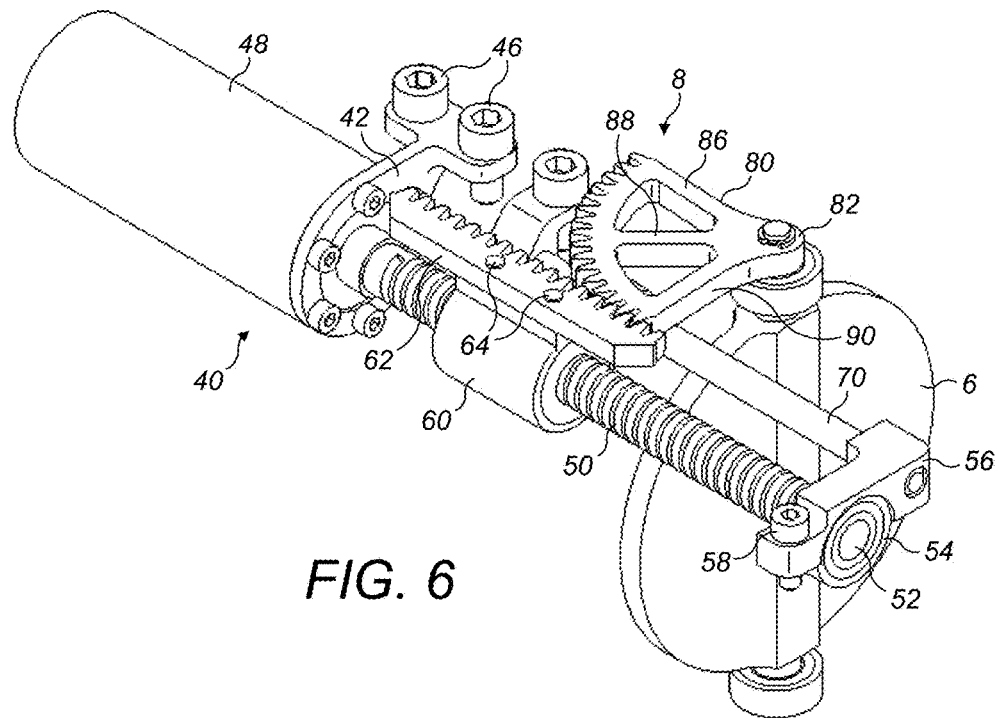
FIG. 6 shows the components in a valve closed position.

As will be seen, for example, from FIGS. 4 and 6, the pinion gear 80 extends over the anti-rotation shaft 70. This may also provide a compact arrangement.

As mentioned above, the valve housing 4 is closed by a cover 14. The cover 14 may comprise an electrical connector 102 for connection of an electrical supply to the electric motor 48 of the actuator 40. Of course in other embodiments, the electrical connection may be provided on another part of the valve housing 4.

The operation of the valve will now be described with reference to specifically FIGS. 6 and 7.

In the closed condition shown in FIG. 6, the drive nut 60 is positioned adjacent a proximal end of the drive spindle 50. As the drive spindle rotates, the nut 60 will move along the drive spindle 50 due to the anti-rotation shaft 70 engaging with the nut collar 68.

Axial movement of the nut 60 moves the pin rack gear 62 in an axial direction causing rotation of the pinion gear 80 in turn causing rotation of the valve element 6. In its end position, illustrated in FIG. 7, the pinion gear 80 has been rotated by approximately 90° so as to move the valve element 6 to its open position.

The speed of valve opening will be determined by the rotational speed of the actuator motor 48 and the pitch of the gear teeth 92, 94. Also, the valve element 6 may be stopped at any position intermediate its end positions to regulate flow through the duct 16. The use of an electric motor 48 facilitates this and may provide for accurate angular positioning of the valve element. For example, in certain embodiments, the motor 48 may be provided with a resolver which will accurately count the revolutions of the motor 48, thereby allowing accurate determination of the movement of the drive nut 60. In one example, a resolver may be mounted at an end of the motor 48.

The valve element 6 may be held in its operative position by suitable locking means. In some embodiments the drive spindle 50 may be locked in position by a mechanical lock (not shown). In another embodiment, the motor 48 may be locked electrically.

In addition, to prevent over rotation of the valve element 6, hard stops may be provided. For example, stops or bumpers may be provided which engage the drive nut 60, rack gear 62 or pinion gear 80. The stops may be formed in, or mounted to, the valve housing 4 and/or on the mounting bracket 42, mounting bracket 56 and mounting arm 74

The disclosed embodiment may also be advantageous from a cost point of view as the individual components are easily sourced and may be easily assembled. Also, the arrangement may not need any liquid lubricants, leading to reduced maintenance and longer product life.

Also, it will be appreciated that the above is a description of just one embodiment of the disclosure and that various modifications may be made thereto without departing from the scope of the disclosure.

For example, an alternative drive nut anti-rotation mechanism may be provided. This may comprise an anti-rotation surface being provided on or attached to the valve housing 4, along which the drive nut 60 may slide in a face to face contact, or a groove in which a portion of the drive nut 60 may engage.

In addition, while described in the context of a butterfly valve, the disclosure has much broader application. For example, the actuation mechanism 8 may be used in other rotary valves such as port valves, or in any other equipment where a rotary actuation movement is required. Exemplary fields of application may include aircraft applications, for example in air conditioning systems and fluid control systems. However, the disclosure also has application to non-aircraft environments.

The embodiments described can easily be adapted to various applications by appropriate choice of components. For example, the torque of the drive motor 48, the pitch of the drive spindle 50 and the gears 60, 80 can be chosen to provide the desired rotational speed of the valve element 6.

It will also be appreciated that the desired angle of rotation of the driven element such as the valve element 6 may be chosen to suit the particular application. This can be achieved by a suitable choice of the spindle pitch and length and angular extent of the pinion gear for example. Rotation of greater than 360° may be possible in certain embodiments. In such a case, a long spindle and a small diameter pinion gear may be utilised. To provide accuracy with a smaller angular rotation, a relatively short spindle and larger diameter pinion gear can be used. This will also allow the application of a higher torque to the driven element which may be advantageous in certain applications.

The invention claimed is:

1. A rotary valve assembly comprising:
    a valve element rotatably mountable within a flow passage for rotary motion between an open position in which it permits flow through the flow passage and a closed position in which it blocks flow through the flow passage;
    a valve housing comprising a duct portion receiving said valve element and an actuation portion receiving an actuation mechanism; and
    said actuation mechanism including:
        an electric drive motor coupled to a threaded drive spindle;
        a threaded drive nut received on said drive spindle for movement along said drive spindle;
        a rack gear coupled to said drive nut; and
        a pinion gear drivingly engaged with said rack gear and drivingly couplable to said rotary element;
    wherein said actuation portion comprises an overhanging portion that laterally overhangs over a side of said duct portion, said drive motor being at least partially arranged in said overhanging portion, wherein the drive spindle is arranged parallel to a longitudinal direction of the flow passage
    an anti-rotation element operatively cooperating with said drive nut to prevent said drive nut rotating on said drive spindle; and
    the anti-rotation element comprises a shaft extending parallel to said drive spindle, said drive nut comprising a collar which is slidably received on said shaft.

2. A rotary valve assembly as claimed in claim 1, wherein distal ends of said drive spindle and said shaft are supported in a common support.

3. A rotary valve assembly as claimed in claim 1, wherein said pinion gear projects over said shaft.

4. A rotary valve assembly as claimed in claim 1, wherein said pinion gear extends over an angle of less than 360°.

5. A rotary valve assembly as claimed in claim 4, wherein said pinion gear is a quadrant gear.

6. A rotary valve assembly as claimed in claim 1, wherein said valve element comprises a disc.

7. A rotary valve assembly as claimed in claim 1, wherein said actuator portion is integral with said duct portion.

8. A rotary valve assembly as claimed in claim 1, further comprising a cover removably closing said actuation portion.

9. A rotary valve assembly as claimed in claim 8, wherein said cover comprises an electrical connector for connection of a power supply to said electric drive motor.

10. A rotary valve assembly as claimed in claim 1 wherein said duct portion comprises mounting flanges at opposed ends thereof.

* * * * *